United States Patent [19]
Wass et al.

[11] Patent Number: 5,546,990
[45] Date of Patent: Aug. 20, 1996

[54] METHOD OF MEASURING FLOW THROUGH A FITTING WITH AN ORIFICE PLATE FOR REDUCING ECCENTRICITY

[75] Inventors: Donald J. Wass; Anthony E. Carter, both of Houston, Tex.

[73] Assignee: Daniel Industires, Inc., Houston, Tex.

[21] Appl. No.: 385,806

[22] Filed: Feb. 9, 1995

Related U.S. Application Data

[63] Continuation of Ser. No. 125,587, Sep. 23, 1993, Pat. No. 5,419,372, which is a continuation of Ser. No. 849,239, Mar. 10, 1992, which is a division of Ser. No. 659,989, Feb. 22, 1991, Pat. No. 5,181,542.

[51] Int. Cl.⁶ ........................................................ F15D 1/02
[52] U.S. Cl. ........................... 138/44; 73/861.61; 138/40
[58] Field of Search ........................ 73/861.61; 137/315; 138/44, 94, 94.3; 251/120, 205, 206; 269/305, 309

[56] References Cited

U.S. PATENT DOCUMENTS

| | | | |
|---|---|---|---|
| 1,792,950 | 2/1931 | Welcome et al. | 138/44 |
| 1,808,715 | 6/1931 | Reynolds | 138/44 |
| 2,050,544 | 8/1936 | Robinson et al. | 138/44 |
| 5,305,796 | 4/1994 | Klak | 138/44 |
| 5,456,288 | 10/1995 | Jacobs | 73/861.61 |

Primary Examiner—David Scherbel
Assistant Examiner—Terrence R. Till
Attorney, Agent, or Firm—Alton W. Payne

[57] ABSTRACT

An orifice installation for centering the center of a plate carrying device within a fitting is disclosed. The plate carrying device has a centering opening at its base which interacts with a stop pin in the base of the fitting. The plate carrying device further has ears on either side which interact with ears formed on the sides of an enlarged opening in the fitting to receive the carrying device therein in order to laterally center the carrying device. An opening is also formed in the top of the carrying device in which a plunger pin is positioned. A valve carrier of the fitting has a downwardly facing extension which upon positioning of the plate carrying device within the enlarged opening in the fitting and moving the valve carrier into place will contact the plunger pin, further stabilizing the carrier device within the fitting.

7 Claims, 9 Drawing Sheets

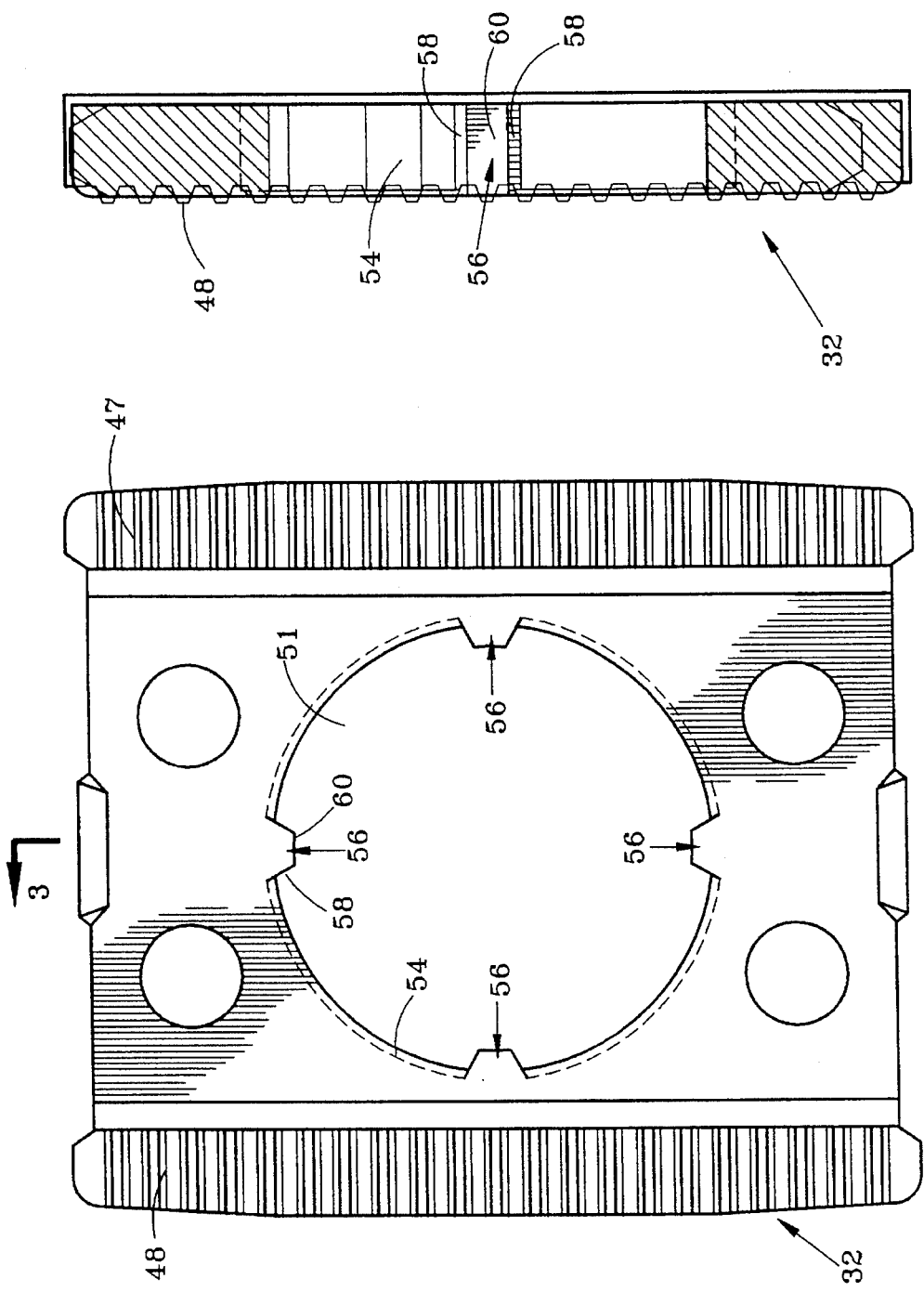

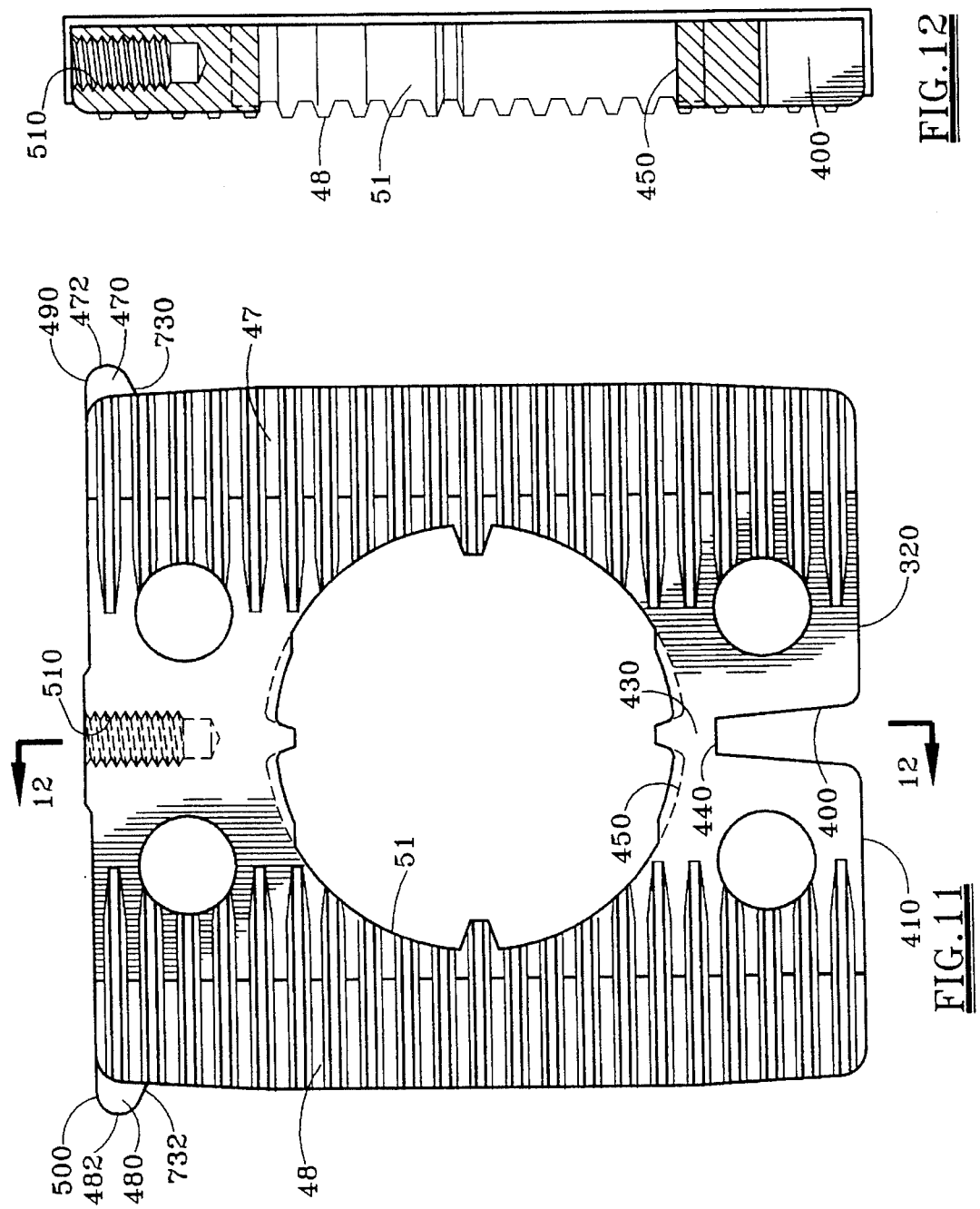

METHOD OF MEASURING FLOW THROUGH A FITTING WITH AN ORIFICE PLATE FOR REDUCING ECCENTRICITY

This is a continuation of application Ser. No. 08/125,587 filed on Sep. 23, 1993 of Donald James Wass and Anthony E. Carter for ORIFICE SYSTEM MOUNTING ASSEMBLY, now U.S. Pat. No. 5,419,372 issued May 30, 1995, which application is a continuation application of application Ser. No. 07/849,239 filed on Mar. 10, 1992 of Donald James Wass and Anthony E. Carter for ORIFICE SYSTEM MOUNTING ASSEMBLY which application is a divisional application of application Ser. No. 07/659,989 filed on Feb. 22, 1991, bearing the same name and now U.S. Pat. No. 5,181,542 issued Jan. 26, 1993.

FIELD OF THE INVENTION

The invention relates to flow measurement devices, and in particular, to flow measurement devices using orifice plates and differential pressure as a basis of the flow measurement.

BACKGROUND OF THE INVENTION

Pipelines are used to transport fluids such as the production fluids from oil and gas wells. Because the measurement of these fluids is important, orifice plates are installed in special fittings which are installed in-line with pipeline sections. Some fittings may permit an orifice plate to be moved in and out of the flow stream without interruption of the flow through the pipeline. Other fittings permit orifice plates to be moved in and out of the pipeline only by interruption of flow.

The use of orifice measurement for flow has been known since ancient times. The basis of orifice measurement is to place a plate in a flow line, with the plate having an opening which is smaller than the opening of the flow line. By reading the upstream and downstream pressure on either side of the plate, and calculating the difference of pressure between the upstream and downstream pressures, one can infer the rate of flow in the pipe line.

The accuracy of the measurement given by the orifice is dependent on many factors, including the ratio of the orifice hole to the diameter of the pipe, the length of straight run of the upstream and downstream pipe or tube sections on either side of the orifice, the eccentricity of the orifice hole in the pipe or tube and the like. The standards to assure accuracy have been governed by ANSI Standard ANSI/API 2530, which are wholly adequate for flow measurement.

Nevertheless, there has been a series of meetings to significantly revise API/AGA standards, which would constitute a revision to *Manual of Petroleum Measurement Standards,* Chapter 14, "Natural Gas Fluids Measurement", which includes Section 3, "Concentric, Square-edged Orifice Meters". The revised Section 3 may become an update and would then become a revision to ANSI Standard ANSI/API 2530; i.e.: AGA Report No. 3.

These new requirements probably will be adopted by some companies even though additional costs will,be attendant with mechanical changes associated with the requirements. The new requirements require greater control on centering (concentricity or eccentricity) of orifice plates as installed in any holding device. However, most orifice plate holding devices other than flanges require some manner of plate/seal/carrying device combination. The most common seal of this type is an elastomeric seal which is assembled around the orifice plate. This type of seal may not yield the greater control of centering required by the new revisions with respect to installed assemblies. This is due to molding tolerances.

There is, therefore, needed an orifice plate and seal combination that permits greater control of concentricity at installation while still permitting the current common sealing aspects presently in use. A previously filed application, Ser. No. 629,130, dated Dec. 18, 1990, addressed and solved this problem as shown in FIGS. 1–10 and in the following description.

In addition, there is also a need to properly center the plate carrying device which holds the orifice plate to control its placement within the flow passage of the orifice fitting so that greater control of concentricity of the orifice plate within the passage while substantially using the current architecture for fittings to introduce the plate carrier into the fitting are still practiced.

SUMMARY OF THE INVENTION

The present invention discloses the use of the above orifice plate in its plate carrying device introduced within the body of an orifice fitting while managing the orientation of the plate carrying device in the orifice fitting. The depth of the opening normally available under the prior art for the base of the plate carrying device is substantially increased and ears are provided on the plate carrying device. A plunger pin is also located in an opening in the top of the plate carrying device. Ears are placed on either side of the orifice fitting opposite to the ears of the plate carrying device, to centrally place the plate carrying device within the orifice fitting. In addition, a stop is located in the orifice fitting for insertion into the bottom opening of the plate carrying device.

BRIEF DESCRIPTION OF THE DRAWINGS

For a further understanding of the nature and objects of the present invention, reference is made to the following drawings in which like parts are given like reference numbers and wherein:

FIG. 2 is a front view of a plate carrying device for use within an orifice fitting;

FIG. 3 is a cross-sectional view taken along section lines 3—3 of FIG. 2;

FIG. 11 is a front view of the preferred embodiment of the present invention of a plate carrying device for use within an orifice fitting of the preferred embodiment of the present invention;

FIG. 12 is a cross-sectional view of the preferred embodiment of the present invention taken along section lines 12—12 of FIG. 11;

DESCRIPTION OF THE EMBODIMENTS

The present invention discloses an orifice plate carrying device and orifice fitting and method for centralizing the orifice plate and carrying device in an orifice fitting.

Figure 1:
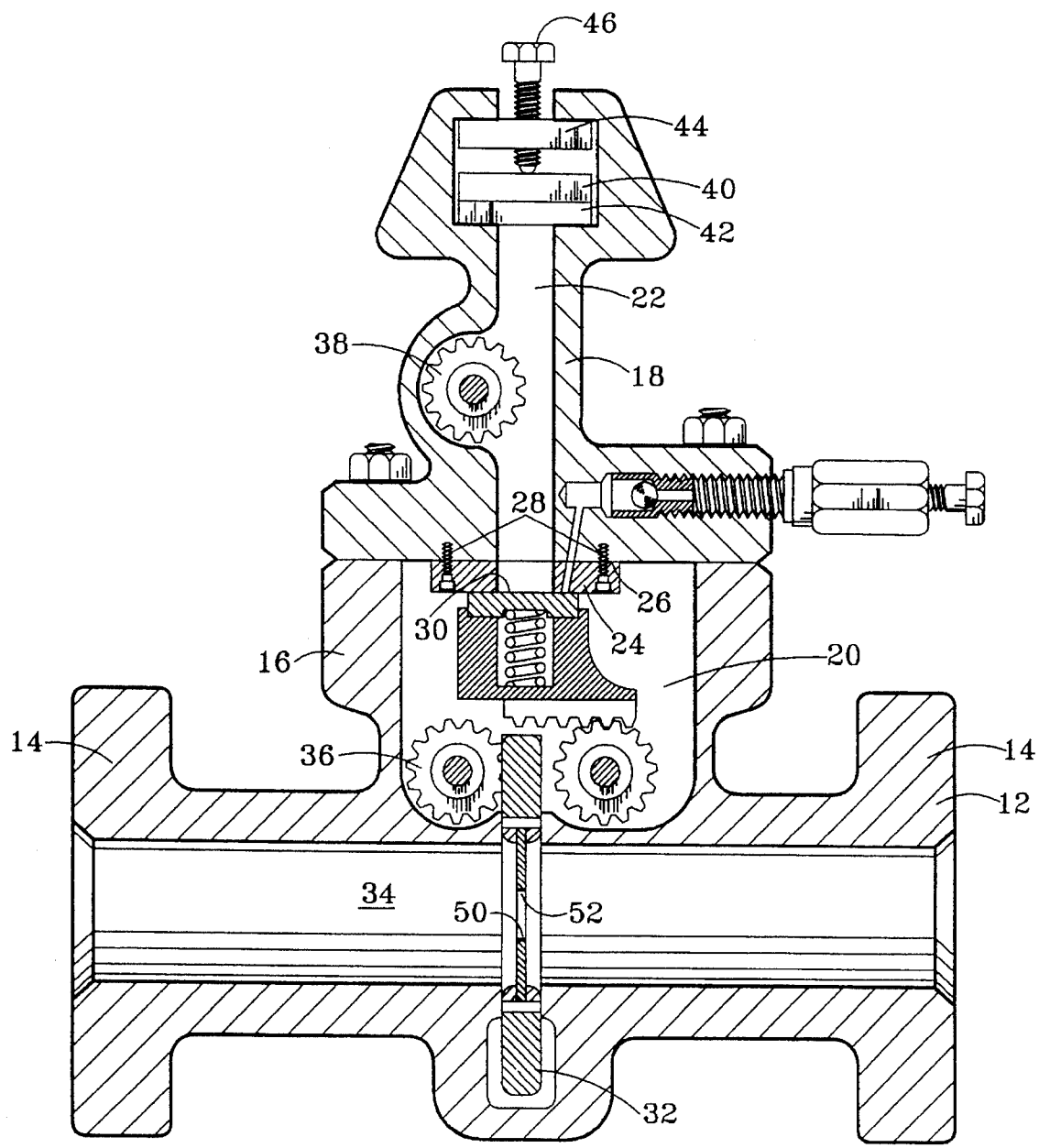
FIG. 1 illustrates a sectional elevation view of an orifice fitting.

FIG. 1 illustrates an orifice fitting 12. As illustrated, orifice fitting 12 includes flanges 14 which are used to bolt fitting 12 to sections of the pipeline (not shown). Alternately, the orifice fitting 12 may include weld bevels (not shown) and may be welded directly into the pipeline, or a combination of a flange and a weld bevel may be used to place the fitting into the pipeline.

Orifice fitting 12 also includes body 16 and top 18. Body 16 encloses lower chamber 28 which is in fluid communication with fluid 34 from the interior of the pipeline, and top 18 encloses upper chamber 22. Valve seat 24 and valve seat gasket 26 are connected to top 18 with valve seat screws 28. Aperture 30 defines an opening through valve seat 24 and valve seat gasket 26 which permits the communication of fluids therethrough.

Valve seat 24 is illustrated as a generally rectangular plate having a lower base or surface which substantially constitutes a flat plane surface. Valve seat 24 can be constructed from alloy iron or other material. Valve seat gasket 26 can be constructed from a gasket material, such as graphite asbestos, and valve seat screws 28 can be constructed from a chemically treated steel or alloy.

As illustrated in FIG. 1, orifice plate carrying device 32 is located in communication with pipeline fluid 34. Orifice plate carrying device 32 can be raised and lowered within orifice fitting 12 by operating lower drive 36, comprising a gear shaft and pinions, and upper drive 38, also comprising a gear shaft and pinions.

Upper chamber 22 is sealed from the ambient environment with sealing bar 40 and sealing bar gasket 42 which are retained with clamping bar 44 and clamping bar screws 46.

As illustrated in FIG. 2, orifice plate carrying device 32 comprises parallel racks 47, 48, adapted to interface with lower drive 36 and upper drive 38. An orifice plate 50 which normally has a center hole 52 as best seen in FIGS. 4, 5, 7, 8, 9, 10 and 14 is located interior to racks 47, 48. Orifice plate carrying device 32 has an opening 51 to receive orifice plate 50 therein.

Orifice plate carrier 32 has an inner circumference 54 for opening 51 which is generally circular in shape but includes ears or protrusions 56 projecting into opening 51. Ears 56 may be generally trapezoidal in shape, having sloping sides 58 and interior surface 60.

Figure 8:
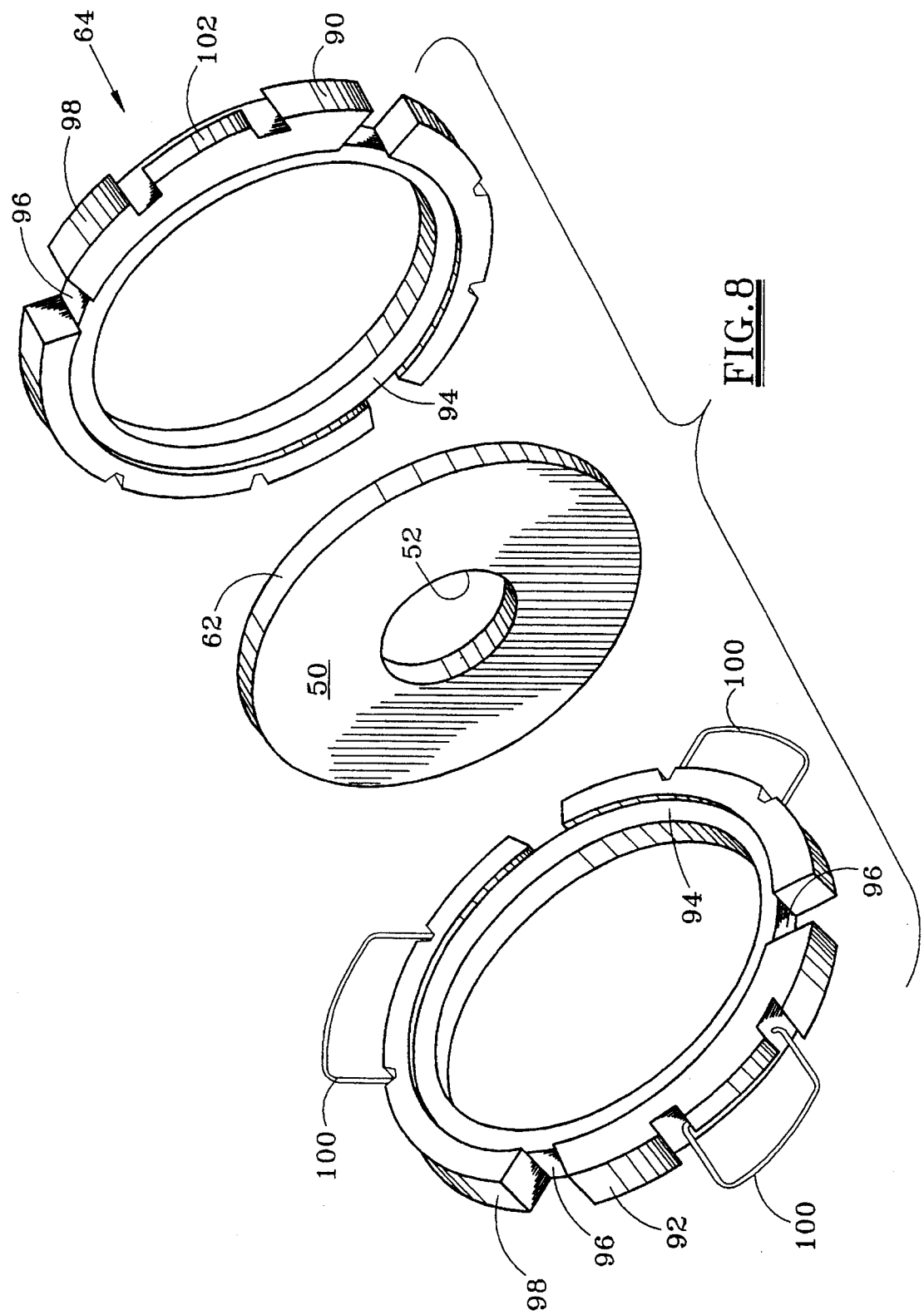
FIG. 8 illustrates an exploded view of an orifice plate and an alternate seal.

As best seen in FIG. 8, orifice plate 50 is generally circular in shape having outer circumference 62. This is a "universal" plate standard, however the invention may be used with any plate. For example, plate 50 may have extensions, which are non-universal, to fit in grooves of a plate holder.

Orifice plate 50 is preferably made of metal and orifice plate carrying device 32 is also preferably made of metal, including ears or protrusions 56.

Figure 6:
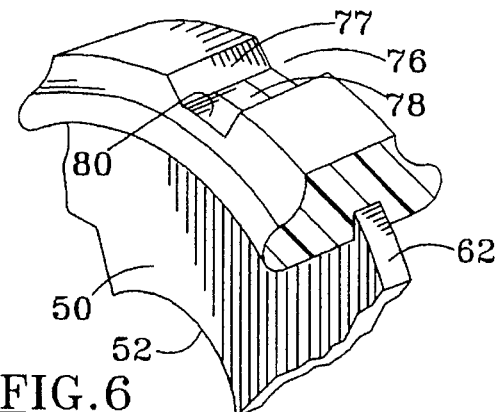
FIG. 6 illustrates a detail of the orifice plate and seal.
Figure 7:
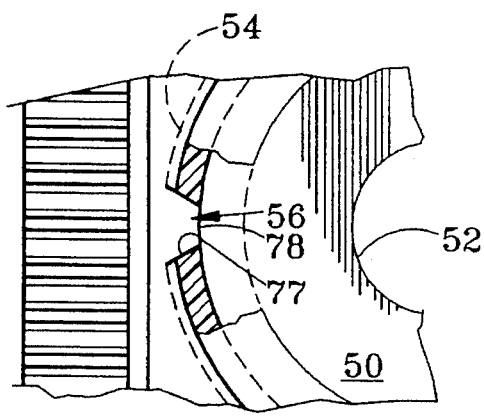
FIG. 7 illustrates a detail of the orifice plate and seal interfaced with a plate carrying device.
Figure 5:
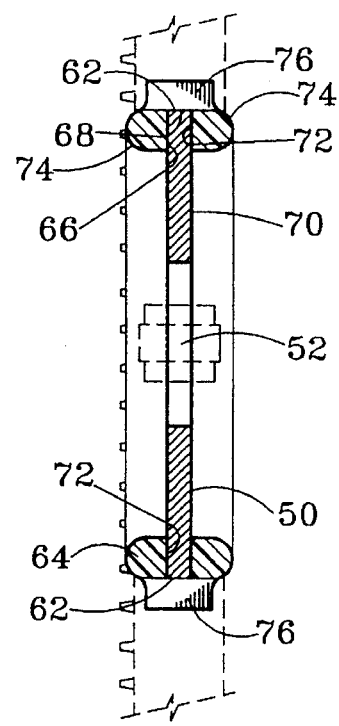
FIG. 5 is a cross-sectional view taken along section lines 5—5 of FIG. 4.
Figure 4:
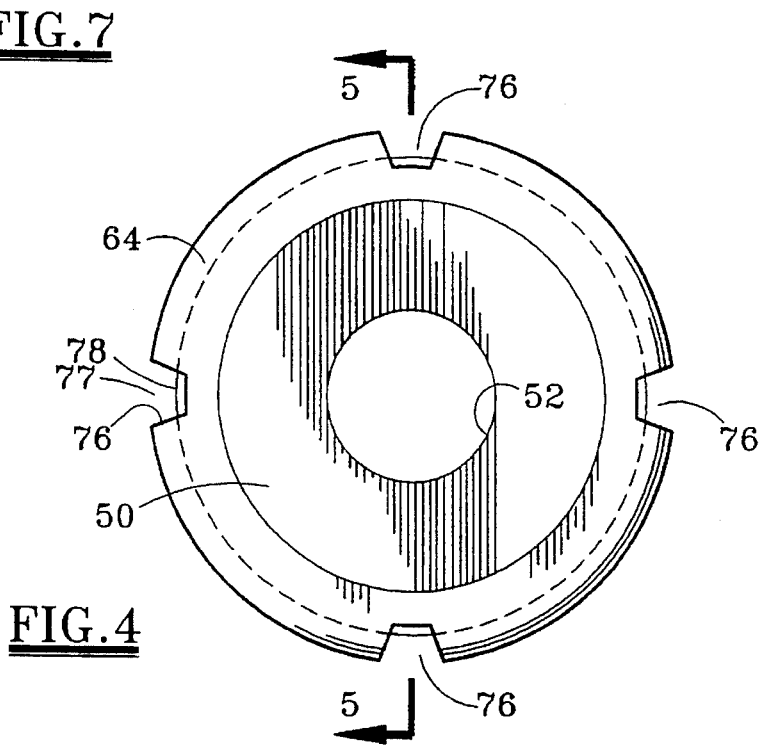
FIG. 4 is a front view of the orifice plate and seal.

As best seen in FIGS. 4 and 5, orifice plate 50 is normally surrounded by an elastomeric gasket 64, such as rubber. Rubber gasket 64 includes slit 66 in the interior of rubber gasket 64, shaped and sized to receive circumference 62 within slit 66, such that outer circumference 62 abuts inner circumference 68 of seal 64. The sides 70 of plate 50 are circumscribed at their extreme outer surfaces immediately adjacent to circumference 62 by interior sides 72 of seal 64. Seal 64 is shaped such that its two exterior side or face surfaces 74 form a seal with the interior surfaces of fitting 12. Grooves or reliefs 76 having sides 77 are formed by molding or cutting in the exterior of seal 64 to expose a portion or tips 78 of the outer circumference 62 of orifice plate 50. Such sides 77 may be slanted. See FIG. 6. The grooves or reliefs 76 correspond in shape and dimension and number and spacing to match ears or protrusions 56. The tips 78 which protrude through the bottoms 80 of seal 64 abut the end 60 of inner circumference 54 ears or protrusions 56. The orifice plate 50 and seal 64 mounted on it are sized to fit snugly within opening 51 such that tips 78 abut ends 60 of ears 56, thereby permitting accurate centering of orifice plate 50, and accordingly hole 52, within the orifice plate carrying device 32.

The sealing device 64 may be any elastomeric material, such as rubber. Such elastomeric material may be vulcanized onto orifice plate 50 or may be form-fitted around orifice plate 50 as appropriate depending on size. Alternately, as shown in FIG. 8, there are some sealing materials that do not vulcanize well and do not have very good elastic properties, such as plastics, example Teflon type materials, and metal.

In such situations as shown in FIG. 8, seal 64 may be formed of two parts 90, 92, each of which has an interior portion to receive orifice plate 50 therein. Each side would also have grooves or reliefs 96 cut into the exterior circumference 98 of each side through which the tips of circumference 62 would protrude to interface with ears or protrusions 56. Accordingly grooves or reliefs 96, like grooves or reliefs 76, would correspond not only with each other but would correspond in shape, dimension, number and spacing to match ears or protrusions 56. The sides 90, 92 would be coupled by, for example, clips 100 affixed to side 92 engaging extensions 102 on the circumference 98 of side 90.

Figure 9:
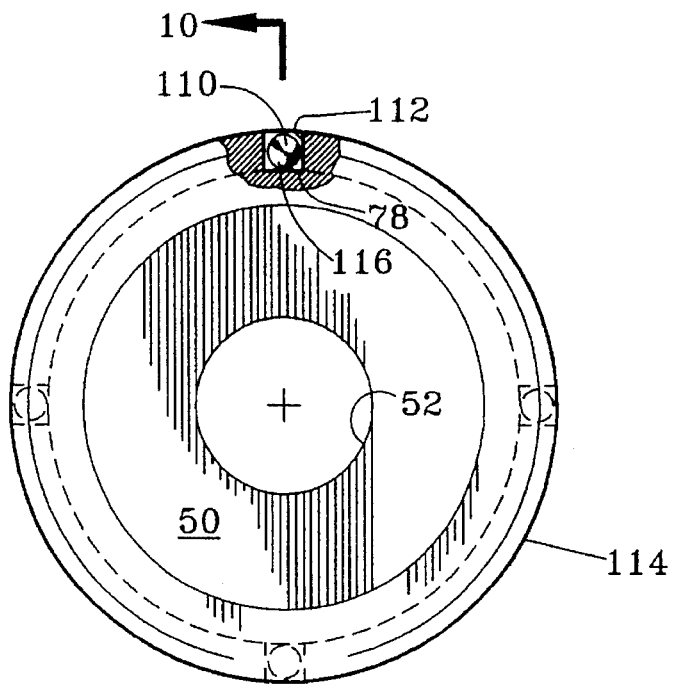
FIG. 9 is a front cross-sectional view of an orifice plate and an alternate seal with mounting bearings.
Figure 10:
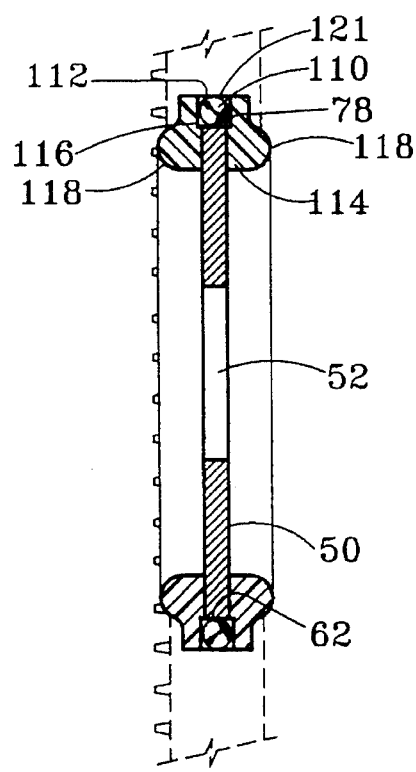
FIG. 10 is a side cross-sectional view of FIG. 9 taken along section lines 10—10 FIG. 9.

As another alternate, and as shown in FIGS. 9 and 10, tips 78 of orifice plate 50 may abut ball bearings 110 fitted into a hole or an alternate groove 112 of a seal 114. In such a circumstance grooves or holes 112 would have substantially vertical sides 116, instead of the slanted sides 77 of seal 64. Vertical sides 116 help hold ball bearings 110 in place. Seal 114 would have sealing sides 118 for forming a seal with the interior surfaces of fitting 12. Because ball bearings 110 may be made with very tight tolerances, the concentricity requirement of the orifice plate 50 would still be met. Further, in this case, the plate carrier 32 would not include ears 56 but would incorporate a close bored internal diameter 121 of such tolerance as to allow the ball bearing 110 to provide an intermediate metal interface between the plate outer circumference 62 and the plate carrier internal diameter 121.

Figure 13:
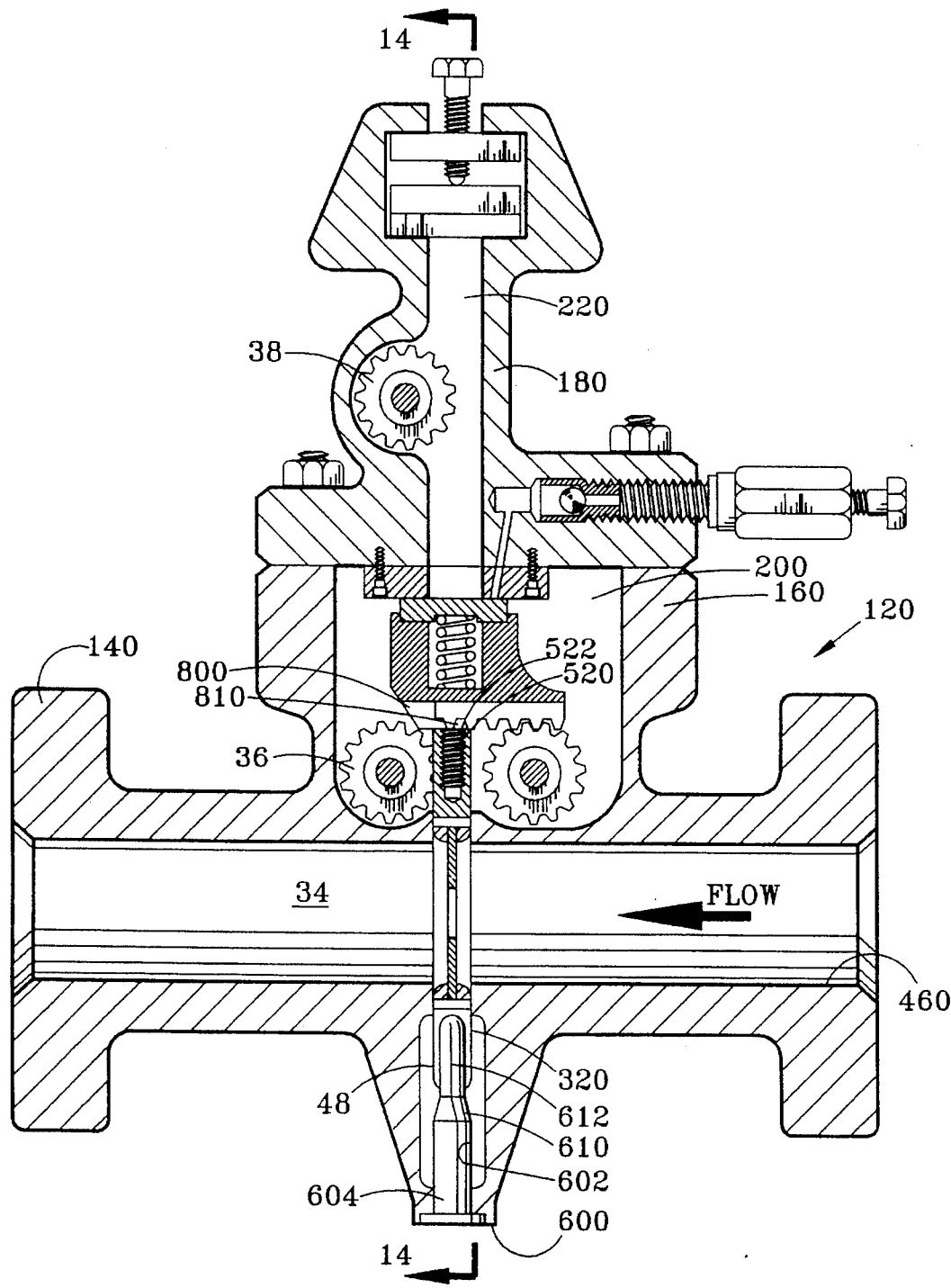
FIG. 13 is a side cross-sectional view of an orifice fitting of the preferred embodiment of the present invention showing a plate carrying device in place.

The basic principles of placing the orifice plate within the plate carrier are preferably used in the preferred and alternate embodiments of the present invention which are described below. FIG. 13 illustrates an orifice fitting 120 including flanges 140 which are used to bolt fitting 120 to sections of the pipeline (not shown). Alternatively, the orifice fitting 120 may include weld bevels (not shown) and may be welded directly into the pipeline or a combination of a flange and a weld bevel may be used to place the fitting into the pipeline. Orifice fitting 120 also includes body 160 and top 180. Body 160 encloses lower chamber 200 which is in fluid communication with fluid 34 from the interior of the pipeline, and top 180 encloses upper chamber 220. A valve seat 24 and valve seat gasket 26 of the type shown in FIG. 1 may be connected to the top 180 with screws such as valve seat screws 28. An aperture 30 would be provided to define an opening through valve seat 24 and valve seat gasket 26 which would permit the communication of fluids and an orifice plate there through, as in FIG. 1.

As illustrated in FIG. 13, an orifice plate carrying device 320 is located in communication with pipeline fluids 34. Orifice plate carrying device 320 can be raised and lowered within orifice fitting 120 by operating lower drive 36 and an upper drive 38, as in FIG. 1.

Upper chamber 220 may be sealed as in FIG. 1 from ambient environment with a sealing bar such as sealing bar 40 and sealing bar gasket 42 which are retained with a clamping bar 44 and clamping bar screws 46.

As illustrated in FIG. 11, orifice plate carrying device 320 comprises parallel tracks 47, 48, adapted to interface with lower drive 36 and upper drive 38. The construction of and materials of construction of orifice plate 50 and the orifice plate carrying device 320 is the same description of the orifice plate 50 and the orifice plate carrying device 32 and its alternate embodiment as set out above described FIGS. 1–10, except as orifice plate carrying device 320 differs from orifice plate carrying device 32 which is described below.

Figure 15:
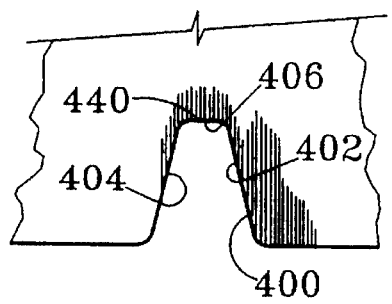
FIG. 15 is a detailed view of the plate carrying device of the preferred embodiment of the present invention showing the opening at the base of the plate carrying device.

As shown in FIG. 11, an opening or indentation 400 is cast into plate carrier device 320. Preferably, opening 400 extends from the base 410 of plate carrier device 320 to the interior of plate carrier device 320. Preferably such opening extends approximately 5–25%, and preferably 7–18%, of the overall length of plate carrier device 320 (measured from base 410 to top 420) into the interior of plate carrier device 320. There would typically be a piece of material 430 extending from, the top 440 of opening 400 to the outer circumference 450 of hole 51. The length of material 430 from the top 440 to the outer circumference 450 would be approximately 2–10%, and preferably 3–7%, of the length of plate carrier 320 from base 410 to top 420. Preferably opening 400 should be a depth as high as reasonably appropriate to still leave sufficient mechanical strength in section 430 to prevent distortion of plate carrier 320 and to permit casting. This depth which should be as great as possible gives less possibility for movement of the center of the orifice 50 with respect to the center of the fitting passageway or passage 460 of the fitting 120. As best shown in FIG. 15, opening 400 has slanted sides 402, 404 terminating in a flat inner surface 406 of top 440.

Figure 17:
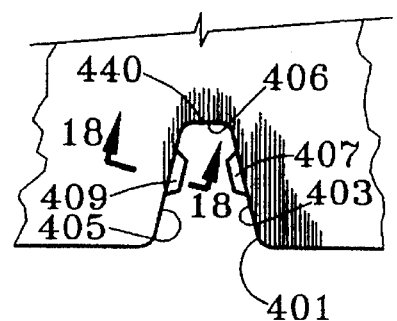
FIG. 17 is an alternate detailed view of the plate carrying device of the present invention showing a different opening at the base of the plate carrying device.
Figure 18:
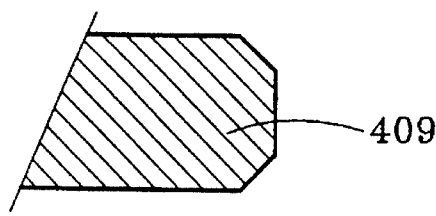
FIG. 18 is a cross-sectional view of the opening at the base of the plate carrying device of the alternate embodiment of the present invention taken along section lines 18—18 of FIG. 17.

As shown in FIGS. 17 and 18, an alternative hole 401 has sides 403, 405, bearing flanges 407, 409 respectively. Flanges 407, 409 protrude from sides 403, 405, respectively, toward the center of opening 401. Sides 403, 405 are still slanted towards inner surface 406 of top 440.

Figure 14:
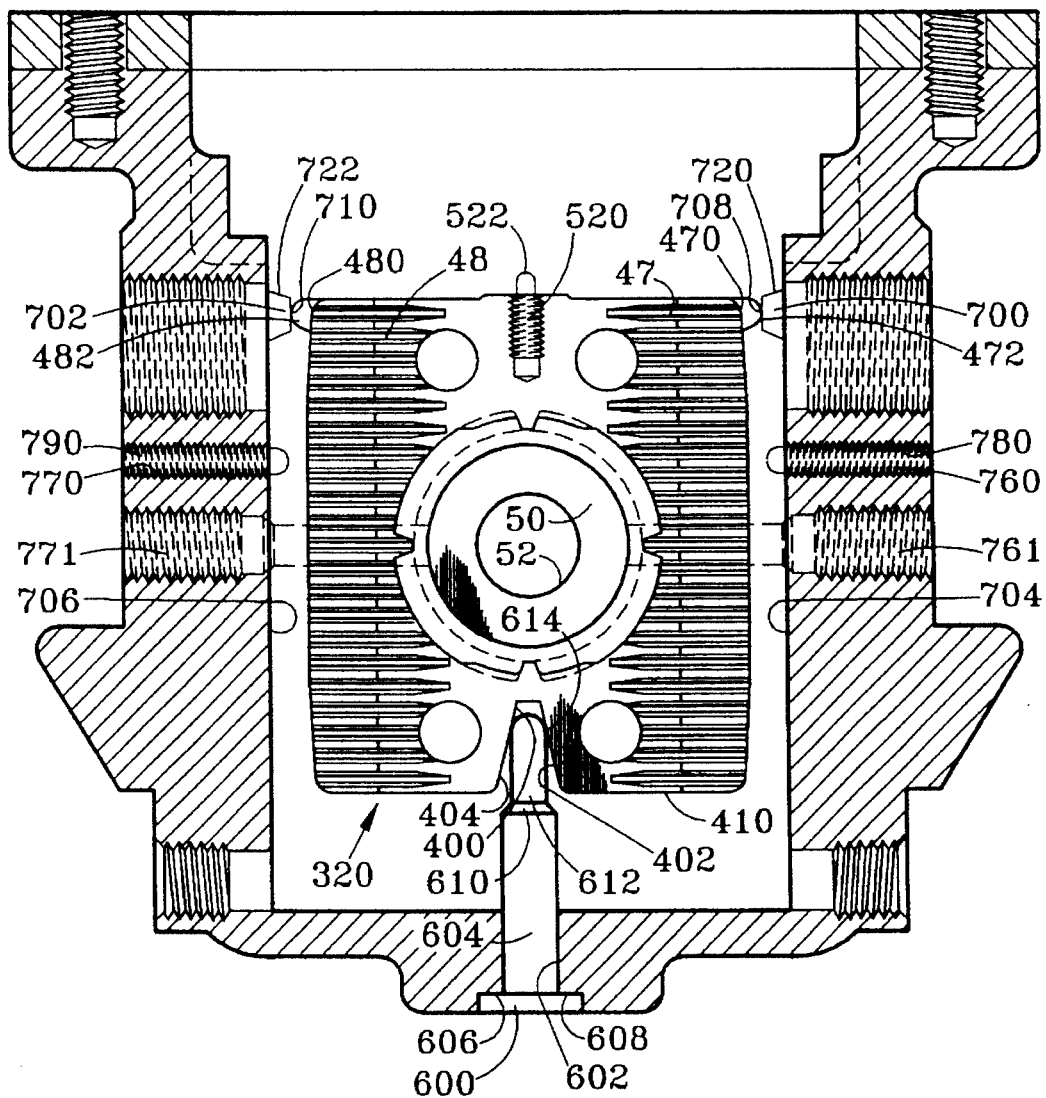
FIG. 14 is a partial cross-sectional view of the preferred embodiment of the present invention taken along section lines 14—14 to FIG. 13.

Plate carrier device 320 further has two ears 470, 480 cast into the sides of plate carrier device. 320 adjacent gear racks 47, 48. Ears 470, 480 are machined so that they extend substantially beyond the side of gear racks 47, 48 and are smoothed at their tops 490, 500 to be substantially coplanar with top 420. Ears 470, 480 are rounded to reduce their contact surface. This avoids binding because of the tight tolerance of machining. As shown in FIG. 14, the sides 472, 482 of the rounded ears 470, 480 may be slightly flat.

Ears 470, 480 are located substantially at the top of plate carrier device 320 on opposed ends to permit greater angular displacement from the center of hole 51. This permits greater tolerance to foreign material and other offsets which would cause angular displacement of the center of hole 51 because the geometric ratios of the distances of ears 470, 480 from the center of hole 51 are much larger than adjustments substantially horizontally coplanar with the center of hole 51, as in the prior art.

An opening 510 is formed in the upper surface 420 of plate carrier 320 by machining or other suitable means. Opening 510 is preferably sized to be suitable for insertion of a spring plunger, such as those manufactured by Reid Tool Supply Company which are spring-loaded pins. Such pins provide positive spring tension. See FIGS. 13 and 14 wherein are shown spring plungers 520 having spring-loaded pins 522 provided therein. Typical standard catalog numbers for spring plungers would be SLS1-11 or STS1-11 in the Reid Tool Supply Company catalog (see page 70). Metallurgies will cause changes with service of the orifice system. The pin spring plunger assembly 520 typically is used to hold plate carrier device 320 in place within fitting 120, as will be discussed in the following.

Referring to FIGS. 13 and 14, the orifice fitting 120 must also be altered from the configuration shown in FIG. 1 in order to have greater placement of the center of hole 51 accurately within passage 460.

Figure 16:
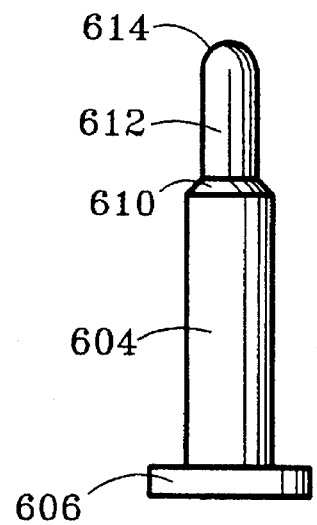
FIG. 16 is a detail of the stop of the orifice fitting of the preferred embodiment of the present invention.

A hole 602 having a shoulder 608 therein is formed in the base 600 of orifice fitting 120. A locating stop pin 604 (FIG. 16) is placed in opening 602. Locating stop pin 604 has a base 606 to match shoulder 608. Base 606 is welded or otherwise attached by suitable means to base 600 in hole 602 to attach stop pin 604 to base 600. Stop pin 604 includes shoulders 610 approximately halfway along the length of stop pin 604. Stop pin 604 is substantially round. Further, stop pin 604 has a narrowed portion 612 extending beyond shoulder 610. The extended portion 612 is sized to project into opening 400 and ultimately to contact slanted walls 402, 404 at their upper ends forming a tight fit with the surface 614 of extension 612 with slanted walls 402, 404.

Ears 700, 702 are formed in the side walls 704, 706 of the lower portion 160 of orifice fitting 120. Typically, ears 700, 702 are formed by casting, or other suitable means such as building up the area with weld, on the walls 704, 706 and then machining the ears 700, 702. Ears 700, 702 are machined for approximately a 45° angle, preferably with a set of substantially flat sides 708, 710. The spacing of ears 700, 702 are such that when plate carrier 320 has opening 400 bottomed on stop 604, substantially flat surfaces 72, 482 of ears 470, 480, respectively, are opposite the flat surfaces 708, 710, respectively, of ears 700, 702, respectively. The upper end surfaces 720, 722 of ears 700, 702, respectively, have a slant to interact with rounded surfaces 730, 732, respectively, to center plate carrier 320 within the interior 200 of fitting 120 as the gears 36 engage racks 47, 48. In this manner, the plate carrier 320 remains on gears 36 during the process of lowering the plate carrier 320 by the gears 36 acting on racks 47, 48 until opening 400 bottoms onto stop 604. As discussed above, by having ears 470, 480 and 700, 702 substantially at the top of plate carrier 320, any foreign material within those surfaces has a small displacement of the center of hole 51 with respect to the center of passage 460. A certain amount of sliding action especially when the fitting 120 is not in a vertical position, will occur between the lower surface 730, 732 of ears 470, 480, respectively, and the upper surface 720, 722 of ears 700, 702, respectively, which has a cleaning action with respect to foreign materials and also minimizes sliding to avoid the wear on ears 470, 480.

As further seen in FIG. 14, pins 760, 770 are formed in holes 780, 790 respectively in the sides 704, 706 of fitting 120 above pressure taps 761, 771, respectively. Pins 760, 770 project substantially to the approximate center of the sides of plate carrier device 320. These help in alignment especially to inhibit movement of plate carrier device 320 with respect to orifice fitting 120 which might cause riding up of ears 470, 480 on ears 700, 702 which would cause wear.

Figure 19:
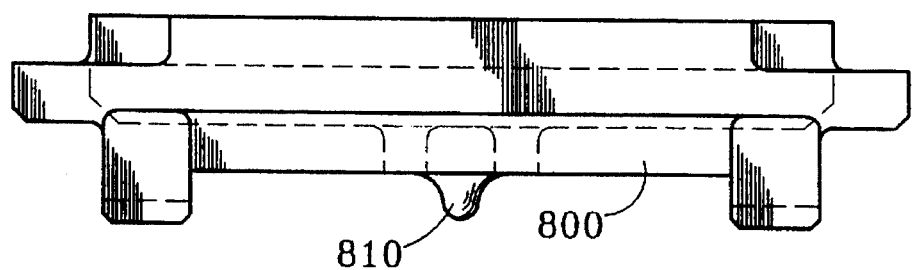
FIG. 19 is a side view of a valve carrier of the preferred embodiment of the present invention.

As seen in FIG. 19, the valve carrier 800 is the same as the valve carrier as shown in FIG. 1. The valve carrier 800 in FIG. 19 has an extension 810 approximately in its center and corresponding in position to plunger pin 522 (FIG. 13). Thus, when plate carrier 320 is in place and aligned with flow passage 460, extension 810 abuts pin 522 further stabilizing plate carrier. 320 in place and preventing wear on ears 470, 480.

As alternatives to the aligning mechanism, one could supply side screws in place of, for example, ears 700, 702 or adjust centering through a mechanism manipulating pin 522. However, hand adjustments do have the difficulty that they would have to be adjusted each time ears 470, 480 are moved. Further, the opening 400 could be of any dimensioning so long as it is substantially close to hole 51. In addition, stop 604 may be oriented horizontally instead of vertically.

In operation, orifice plate 50 is assembled with plate holder 320 as discussed above with regard to the assembly of orifice plate 50 with plate holder 32. Once this assembly has been accomplished, it is introduced into fitting 120 as gears 38, 36 lower the plate carrier 320 towards stop 604. Pins 760, 770 provide preliminary guidance of plate carrier 320 to aid in avoiding abrasion of ears 470, 480 and ears 700, 702. Ears 470, 480 have their lower portions 730, 732 come into whole or partial contact with ears 700, 702, respectively. The upper surfaces 720, 722 of ears 700, 702 facilitate ears 470, 480 to slide up upper surfaces 720, 722, respectively, until the substantially flat portion 472, 482 of ears 470, 480 contact the substantially flat portion 708, 710 of ears 700, 702, respectively. As the riding up of the ears 470, 480 onto ears 700, 702 occurs, stop 604 enters into opening 400 so that the side walls 402, 404 contact securely surface 614 when the flat portion 472, 482 contacts flat surfaces 708, 710 respectively. At that time, the orifice plate 50 is centered with respect to passage 460. The valve carrier 800 can then be placed so that center member 810 abuts pin 522 (not shown in FIGS. 13 and 14 but substantially identical to FIG. 1), and the orifice system may then be put into service.

The embodiments set forth herein are merely illustrative and do not limit the scope of the invention or the details therein will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be more in the embodiments herein detailed in accordance with the descriptive requirements of the law, it is to be understood that the details herein are to be interpreted as illustrative and not in a limiting sense.

What is claimed as invention is:

1. A method of measuring flow through a fitting with an orifice plate assembly for reducing eccentricity, the fitting comprising a central passage, a stop and at least one fitting ear, the orifice plate assembly comprising an orifice plate and a carrier for receiving the orifice plate, the carrier comprising an indentation and at least one plate ear, the method of measuring flow through the fitting for reducing the eccentricity between the orifice plate and the central passage through the fitting comprising the steps of:

(a) introducing the orifice plate assembly into the fitting, (b) accepting the stop into the indentation during continued introduction of the orifice plate assembly into the fitting for providing general alignment of the office plate assembly within the fitting, (c) engaging the plate ear with the fitting ear during continued introduction of the orifice plate assembly into the fitting for providing precise positional alignment between the orifice plate assembly and the fitting, and (d) abutting the stop within the indentation for terminating the introduction of the orifice plate assembly into the fitting for providing precise positional alignment of the orifice plate assembly in the fitting and for reducing the eccentricity between an orifice plate and the central passage through the fitting.

2. A method of measuring flow through a fitting with an orifice plate assembly for reducing eccentricity as defined in claim 1 wherein the step of accepting the stop into the indentation occurs prior to the step of engaging the plate ear with the fitting ear.

3. A method of measuring flow through a fitting with an orifice plate assembly for reducing eccentricity as defined in claim 1 wherein the step of engaging the plate ear with the fitting ear occurs prior to the step of accepting the stop into the indentation.

4. A method of measuring flow through a fitting with an orifice plate assembly for reducing eccentricity as defined in claim 1 further comprising the step of providing preliminary guidance of the orifice plate assembly upon introduction of the assembly into the fitting for avoiding abrasion of the plate ear and the fitting ear.

5. A method of measuring flow through a fitting with an orifice plate assembly for reducing eccentricity as defined in claim 1 further comprising the step of providing preliminary guidance of the orifice plate assembly upon introduction of the assembly into the fitting for guiding the stop into the indentation during introduction of the orifice plate assembly into the fitting.

6. A method of measuring flow through a fitting with an orifice plate assembly for reducing eccentricity as defined in claim 1 further comprising the step of symmetrically locating a plurality of fitting ears on the fitting and symmetrically locating a plurality of plate ears on the plate for generating a one-to-one operational association of the fitting ears with the plate ears.

7. A method of measuring flow through a fitting with an orifice plate assembly for reducing eccentricity as defined in claim 1 further comprising the step of locating the fitting ear and the plate ear remote from the indentation and the stop.

* * * * *